Sept. 13, 1960          I. I. GRINGORTEN          2,952,074
           PLOTTER FOR NAVIGATIONAL FLIGHT PLANNING
Filed June 10, 1958                          2 Sheets-Sheet 1

INVENTOR.
IRVING I. GRINGORTEN
BY
ATTORNEYS

Sept. 13, 1960     I. I. GRINGORTEN     2,952,074
PLOTTER FOR NAVIGATIONAL FLIGHT PLANNING
Filed June 10, 1958     2 Sheets-Sheet 2

INVENTOR.
IRVING I. GRINGORTEN
BY
ATTORNEYS

2,952,074
Patented Sept. 13, 1960

2,952,074

PLOTTER FOR NAVIGATIONAL FLIGHT PLANNING

Irving I. Gringorten, 14 Sheffield Road, Natick, Mass.

Filed June 10, 1958, Ser. No. 741,200

4 Claims. (Cl. 33—1)

(Granted under Title 35, U.S. Code (1952), sec. 266)

The invention described herein may be manufactured and used by or for the United States Government for governmental purposes without payment to me of any royalty thereon.

This invention relates to a plotter or computer which includes a flat transparent piece of plastic material or Plexiglas marked with lines, graphs, compass rose and slits and designed to speed up long-range flight planning without loss of accuracy. More particularly, the invention is concerned with providing a tool which is useful in speeding up the plotting of flight plans while taking into consideration the speed and direction of the aircraft as well as the speed and direction of the prevailing winds which normally affect the flight pattern of the aircraft.

The task of flight planning becomes significantly great wherever there is a multiple operation of aircraft whose airspeeds and altitudes of flight differ widely. Basically, the aim of flight control operation is to obtain substantially complete coordination of effort among the weather forecaster, flight planner, dispatcher and navigator. Thus, it becomes necessary to standardize the system of flight planning in order to reduce flying time by "minimal" flight planning. The present invention is a tool that is particularly useful for this purpose when used with recently developed wind representation charts.

Accordingly, a primary object of the present invention is to provide a tool for flight planning that is exceptionally versatile. It is usable for all aircraft speeds between 150 knots and 500 knots, for tailwinds as great as 300 knots and headwinds as great as 200 knots.

Another object of the invention is to provide a plotter which can be used in flight planning to plot winds either on a constant-pressure chart or on a chart of streamlines and isotachs.

A further object of the invention is to provide a means for expediting the overall task of single-heading flight planning, flight planning along great circles and rhumb lines or any other fixed track, as well as minimal flight planning.

As mentioned above, the extraordinary versatility of the invention makes it useful as a substitute for elaborate computers which are presently used for flight planning purposes. The user of the invention is capable of determining the hourly air travel of an aircraft when the airspeed and latitude positions are known. Also, the plotter is useful for converting a contour gradient on a weather map into terms of a geostrophic wind velocity.

Many other features and advantages of the invention and its operation as a plotter for rapidly making various navigational determinations necessary for proper flight planning, will become more apparent from the following description taken in connection with the illustrative embodiments in the accompanying drawings, wherein.

Figure 1:
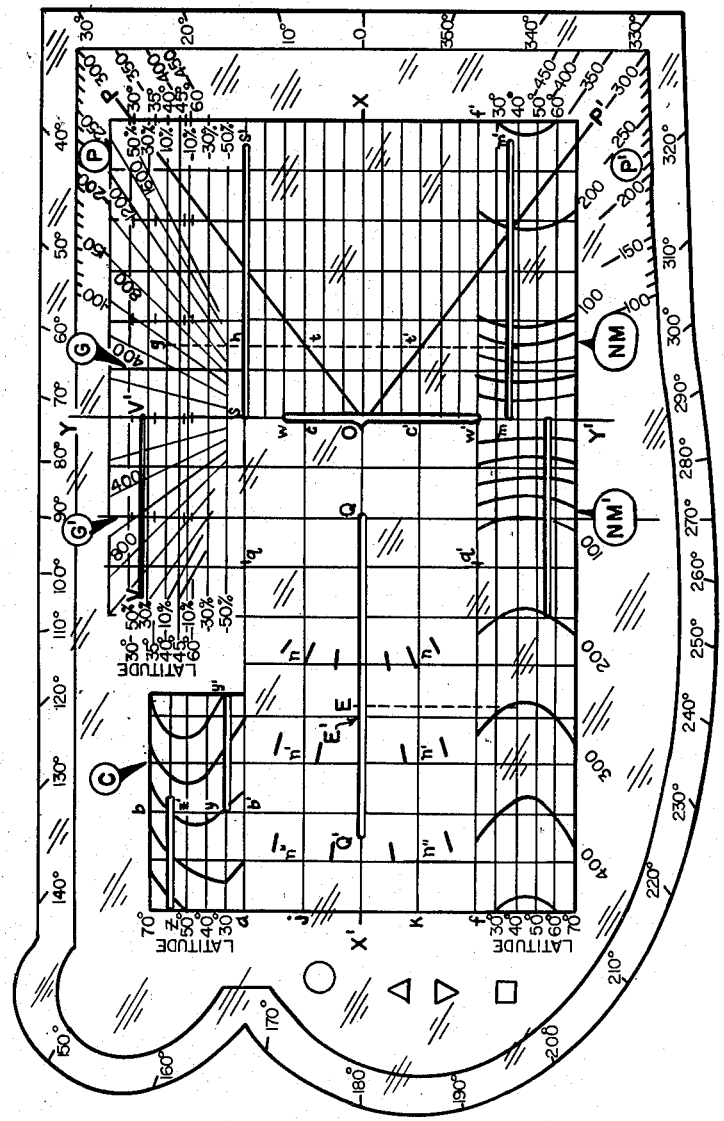
Fig. 1 is a view of the 4-D plotter showing the compass rose as well as the lines and graphs which are necessary for operating the plotter.

Referring now to Fig. 1, there is shown a preferred embodiment of the invention and since it is readily usable with a 4-dimensional analysis of winds (in horizontal, vertical, and in time), the invention may be properly called a 4-D plotter. The plotter itself 13 is constructed from a single piece of thin, transparent plastic material for a given chart projection. In the embodiment shown, the 4-D plotter is assumed to be made for the Lambert-conformal chart, scale 1:10,000,000, with standard parallels at 30° and 60°.

In the lower third of the plotter are scales NM and NM' which indicate map distances versus latitude, much like the scale of distances in nautical miles of any map projection of the earth. The distances are measured from the central vertical line Y'OY, both to the right and to the left. For example, if the airspeed of an aircraft is 300 knots at latitude 20° N. the plotter shows that the airspeed would be 317 chart-knots. The expression "chart-knots" is used to designate the distance on the chart measured with a standard 1:10,000,000 scale.

The scales G and G' in the upper third of the plotter are used to convert a contour gradient into terms of a geostrophic wind velocity. The slant lines of the G-scales are labelled in feet. If the increase in contour interval or D-value of a constant-pressure surface such as 500 millibars per 240 chart-miles is, for example, 570 feet at latitude 40° N., the G-graph shows that this is equivalent to a geostrophic wind component of 75 chart-knots. By looking down to the NM scale, this wind component is seen to be equal to 77 knots at latitude 40° N.

There will be occasions when a percentage correction should be made to the geostrophic wind approximation. For example, if tightly packed contour lines are curved, as around a trough or cyclone, the actual wind will be weaker than the geostrophic wind. Suppose a 30% correction is desired to an initially given wind of 77 knots at latitude 40° N., entered in the G-scale at $g$. Then the 30% correction is obtained by visually following a line parallel to YOY' till the line marked "45°" is reached. This is the zero line. Then a direction is followed, using the slant lines as guides down to the line marked 30%. This gives a corrected velocity of 55 knots at latitude 40° N.

When the chart distance between two points on the map is not 240 nautical miles, it is still possible to find the geostrophic wind component from the D-gradient. For example, if the chart-distance between two points on a map is 300 nautical miles the 300-tick in the P-scale or the P'-scale is joined by a line to the central point O of the plotter. If the difference in D-values between two points is 580 feet at latitude 40° N., the G-graph is entered at point $g$, and a line is visually followed parallel to Y'OY to intersect the slant line OP at $t$ or OP' at $t'$. The line from $t$ parallel to X'OX is followed to intersect the central vertical line at $c$. The procedure yields Oc, a wind component of 60 chart-knots or 63 knots at latitude 40° N.

The C-scale, in the upper left hand portion of the plotter, is a special scale that can be used in the case when the airspeed of the aircraft is 425 knots.

Included in the design of the plotter is a protractor having its center at Q, at the end of a slit Q'Q in the plotter. The upper right-hand corner of the plotter is bounded by two straight lines, while the remainder of the periphery consists of a French curve that can be used for the drawing of time fronts. Also included on the left-hand side of the plotter are a group of geometric cut-outs which may be used as templates for the drawing of small triangles, circles or squares. A number of slits are included in the plotter whose purposes will be explained later. One of these slits is provided with an extra notch at position O.

Some of the operations for which the 4-D plotter may be used, will now be described in detail. One of the first considerations in flight planning is the direction and velocity of the wind at flight level. Below are several determinations which can be made by use of the 4-D plotter.

Suppose the aircraft's position is located on a weather chart that has D-lines or contour intervals on it. Let the airspeed be 300 knots, latitude 40° N. Find the point E on the plotter by means of the NM'-scale and place it over the aircraft's position with the line EO along the aircraft's heading. The distance EO gives the hourly air motion of the aircraft. The next problem is to find the tailwind using the D-gradient. The two lines on the plotter, as and $fw'$, have been placed 240 nautical miles apart with the line X'OX exactly in between them. Approximately midway between E and O read the D-values at the ends of a line crossing the heading, as at $q$ and $q'$. If the D-value at $q$ is less than that at $q'$ there is a tail-wind; if the D-value is greater at $q$ than at $q'$ there is a headwind. For a tailwind, enter the difference of D-values in the G-scale. Suppose this entry is at $g$. Visually follow a line parallel to YOY' down to the slit $ss'$. Place a sharp pencil in the slit at $h$, and slide the plotter forward till the pencil stops the sliding motion on the line YOY'. The point O will now give the position of the aircraft corrected for tailwind. For a headwind, use the G' scale and the slit $vv'$, and slide the plotter backward instead of forward.

When the airspeed is 425 knots, which is considered jet aircraft speed, and the aircraft's position is located on a weather chart, place the plotter over the map with the pencil point inserted in the slit Q'Q and on top of the aircraft's position on the map. Move the plotter forward until stopped by the pencil at Q'. Place the line Q'Q in the direction of the aircraft's heading. Read the difference of D-values across the heading of the aircraft and enter this difference into the C-scale. Make use of one of the slits YY' and ZZ' to enter the pencil point and push the plotter forward (or back) until stopped by the pencil along line $bb'$. The point O will then be on the next hourly position of the aircraft corrected for tailwind.

Figure 2:
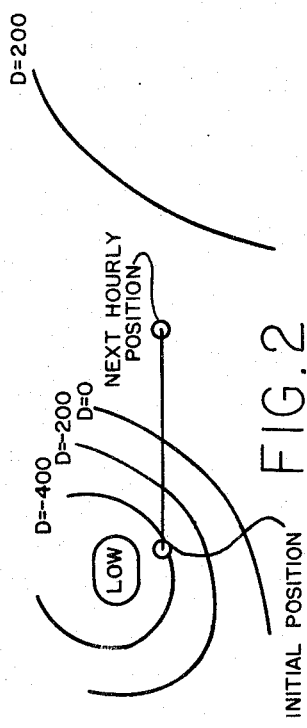
Fig. 2 illustrates a change in tailwind velocity during one hour of flight.

The above method of finding the tailwind component presupposes that the effective tailwind can be determined by the D-gradient at approximately the mid-point of each hourly leg of the flight. But there may be considerable change in the tailwind component from the first half-hour of a flight to the second half-hour of flight as shown in Fig. 2. In such a case, the D-gradient can be measured twice between the lines $jc$ and $kc'$. For example, if the airspeed is 300 knots, the D-gradient between $jc$ and $kc'$ can be read at the mid-point of the 150 nautical miles and entered directly on the G-scale (or G'-scale if it is a headwind effect). After the plotter is pushed forward, the D-gradient between $jc$ and $kc'$ again can be read at the mid-point of the second 150 nautical miles and this value entered into the G-scale. Thus the two values are added mechanically to give the effective hourly tailwind component.

The effect of the crosswind should be determined over the full hourly motion of the aircraft. For example, if the airspeed is 300 knots, the crosswind should be averaged over the 300 nautical mile motion. This is accomplished by first finding the point E' on the plotter a distance of 300 miles from point O, measured with the basic scale of the chart. Then, draw on the plotter the two slant lines between point O and the 300 nautical mile ticks in the P and P'-scales. Place the line EO on the 4-D chart in the direction of the aircraft's heading, read the difference of D-values from E' to O. If the D-value at E' is greater than the D-value at O, then there will be a right-drift. Enter the difference in value of D, say 570 feet, into the G-scale. Follow the guide lines parallel to Y'OY down to the slant line OP'. Then follow the guide lines paralleling line X'OX and enter the crosswind through the slit W'W. For a given aircraft flying at a given altitude, there should be one approximate speed. The lines OP and OP' should be drawn on the plotter for that airspeed, and the plotter used this way for the whole flight plan except possibly for the first hour of climb and last hour of glide.

When the geostrophic approximation to the wind is not readily available and the forecaster finds it best to give the wind in direct terms of direction and speed, then the plotter can be used by selecting the point E corresponding to the airspeed, as determined on the NM'-scale. If the airspeed is 300 knots at latitude 40° N. then the distance EO is equal to 291 nautical miles measured with the 1:10,000,000 scale. Set EO in the direction of the aircraft's heading. Placing the pencil point at O, rotate the plotter about O until the line X'OX parallels the wind direction. Through the slit $mm'$ place the pencil point at the wind speed corrected for latitude. Push the plotter forward until the pencil stops the plotter against the point $m$. Then the point O will be the next hourly position of the aircraft.

Figure 3:
Fig. 3 illustrates how heading and groundspeed are determined, given course, airspeed and D-field or wind components.

To find the heading and groundspeed in the determination of the hourly motion along a fixed path or course, where the course is given by two points on a map, $p_1$ and $p_2$, Fig. 3, place the plotter with point O on top of the point $p_1$ of the map. Rotate the plotter until the line OE lines along the line $p_1p_2$. Let distance OE be equal to the airspeed. Obtain the D-gradient across the axis of the aircraft, that is, the difference of the D-values at $q$ and $q'$. Enter this value in the G'-scale for tailwind or in the G-scale for headwind. Use the slit $vv'$ for tailwind or $ss'$ for headwind, and slide the plotter forward (or back). Next, to obtain the crosswind, read the difference of D-values between points O and E', and enter this difference in the G-scale. If the D-value at E' is greater than at O, follow the guidelines parallel to YOY'' till the line OP' is intersected. Then follow the guidelines parallel to XOX' and plot the crosswind through the slit WW' at point $p_3$ on the chart. With point O of the plotter pushed over point $p_3$ of the chart, rotate the plotter until the point E lies on the line $p_1p_2$. At this stage, make sure that the distance OE is corrected for latitude. Plot the point $p_4$ on the chart through the slit QQ'. The point $p_4$ will then be the hourly position of the aircraft. The line $p_3p_4$ gives the heading, the distance $p_1p_4$ gives the groundspeed. To find the drift angle, keep the pencil point on $p_4$ and slide the plotter forward until stopped by the pencil point at Q, the center of the protractor. The reading of the line $p_1p_2$ on the smaller protractor scale $n$, $n'$, or $n''$ (Fig. 1) gives the drift angle.

Figure 4:
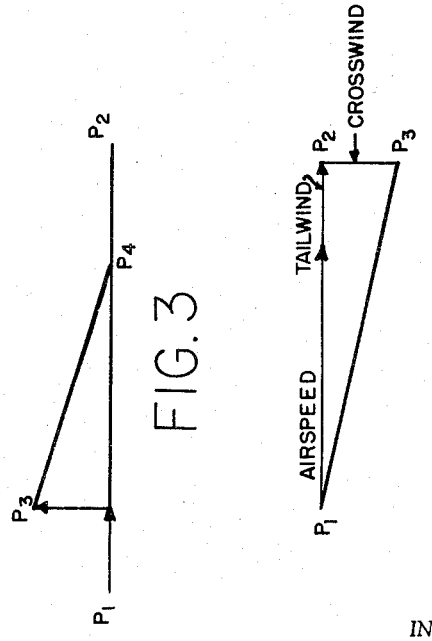
Fig. 4 shows how course and groundspeed are determined, given airspeed, heading and D-field or wind components.

When it is desired to find the hourly motion including the course and groundspeed having given the heading, the procedure as outlined above for determining the tailwind (or headwind) is first followed which gives the forward motion from the point $p_1$ on the chart to the point $p_2$, as shown in Fig. 4. Next the effect of the crosswind is determined which gives the drift from $p_2$ to $p_3$. The direction of the line $p_1p_3$ gives the course and its length gives the groundspeed.

Figure 5:
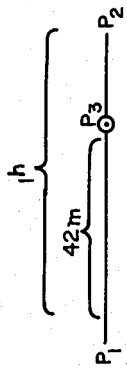
Fig. 5 illustrates estimation of flying time less than one hour.
Figure 6:
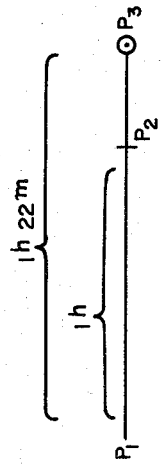
Fig. 6 illustrates estimation of flying time in excess of one hour.

The estimation of flying time between check points is illustrated in Figs. 5 and 6. In estimating flying times of less than one hour (Fig. 5), $p_1$ and $p_2$ are positions on a chart one hour apart. To find the flying time from $p_1$ to $p_3$ place a pencil point through slit $ww'$ on point $p_1$ of the chart. Slide the plotter till the point $w'$ of the plotter is on top of point $p_1$ of the chart. Rotate the plotter till the line (or slit) $ss'$ falls on top of point $p_2$. Since the lines paralleling OX divide the rectangle between $ss'$ and $wf'$ into 12 equal slices, each slice represents five (5) minutes. This makes it possible to estimate the fraction of one hour of flying time from $p_1$ to $p_3$ to the nearest minute. In Fig. 5 this gives the flying time from $p_1$ to $p_3$ as 42 minutes. The lines above $ss'$ have the same spacing as the lines below $ss'$. This makes possible estimation of flying time greater than one hour. For example, in Fig. 6 place point $w'$ of the plotter over $p_1$ on the chart. Rotate the plotter until the line (or slit) $ss'$ passes through $p_2$. Then if the flying time from $p_1$ to $p_2$ is one hour, the flying time from $p_1$ to $p_3$ can be estimated in excess of one hour. In the example of Fig. 6, the time is one hour and 22 minutes.

Figure 7:
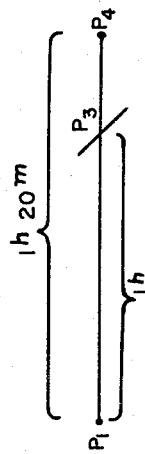
Fig. 7 shows how groundspeed is determined (hourly ground distance), given two check points and flying time between them.

The procedure for finding ground speed or hourly distance of travel from two check points is shown in Fig. 7. If the flying time between check points is known, say one hour and 20 minutes, then place point $w'$ of the plotter over $p_1$ and rotate the plotter till the line representing one hour and 20 minutes passes over the point $p_2$. Through the slit $ss'$ mark point $p_3$ on the line $p_1p_2$. Then the flying time from $p_1$ to $p_3$ is one hour.

The compass rose found on the periphery of the 4–D plotter has its center at point Q which represents a distance of 100 nautical miles from point O. To obtain directions at a point on a chart, place the pencil through the slit $Q'Q$ on the desired point of the chart. Slide the plotter till the pencil stops the plotter at Q. Rotate the plotter till the line $Q'Q$ parallels the desired direction. If the direction is to be measured relative to true north, then the meridian through point Q will intersect the compass rose to give the directional reading.

The operations described above are useful and necessary for proper flight planning, either on a fixed or predetermined track or on a track that is determined by the flight planning device itself. The plotter is particularly effective in reducing the time necessary to determine the various wind effects on the aircraft and to thereby determine the best flight plan to take advantage of the winds so that the aircraft can reach its destination in the shortest possible time.

Although the 4–D plotter has been described with reference to some of its more particular uses, it can be seen that the present invention comprises a relatively simple and practical navigation device which is efficient and reliable in use and operation. The device includes only a single piece of flat printed plastic which may be inexpensively produced and is well adapted to accomplish the functions herein set forth, as well as many others.

It will be understood that the description and drawings include only a single preferred embodiment of my invention and that various changes and modifications in the construction, proportion and arrangement of the scales and other portions of the plotter may be made without departing from the true spirit and scope of the invention.

Having thus described my invention, what I claim as new and desire to secure by Letters Patent of the United States is:

1. A navigational course plotting apparatus capable of being superposed on a chart showing contour lines of geophysical conditions, comprising a transparent sheet of material, a graphic representation thereon having ordinate and abscissa markings of distance from a central reference point, said distance markings being measured at a predetermined latitude, a slot along the axis of said abscissa, a slot along said ordinate passing through said central reference point at the intersection of the abscissa and ordinate axes, said ordinate slot including an enlarged portion at said reference point, a series of plots on said graphic representation, one of said plots being located at one end of said ordinate and including a distance versus latitude graph overlaid on said graphic representation for determining chart distance values at various latitudes, a second plot located at the other end of said ordinate and including a graph of latitude versus the altitude difference between contour lines of a constant pressure surface, a pair of spaced slots oriented in the direction of said abscissa, each of said spaced slots extendng outwardly from said ordinate axis, each of said plots and said graphic representation being interrelated such that a chart distance determination made on one of said plots using said graphic representation is transferable to one of said slots by inserting a pencil-like instrument therethrough and contacting the chart therebeneath, said transparent sheet then being movable relative to said underlying chart in the direction of said abscissa until said pencil-like instrument reaches the end of said spaced slot at the ordinate axis of said graphic representation, the new relative positions of said transparent sheet and said chart showing navigational course data.

2. The flight planning apparatus described in claim 1 including a special angular scale disposed near the outer periphery, said angular scale having its axis at the central reference point and being calibrated to represent aircraft speeds at other than normal rates, thereby allowing the device to be used for flight planning when the speed of the aircraft changes during the flight.

3. The flight planning apparatus described in claim 1 including a compass rose disposed on the outer periphery, said compass rose having its center located at the inner end of the slot along the axis of the abscissa and being useful for determining drift angle of the aircraft during flight.

4. The flight planning apparatus described in claim 1 having an irregularly shaped outer periphery, a portion of said periphery being bounded by straight edges at right angles to each other, and another portion being in the form of curved edges, said periphery being useful to draw contour lines and other necessary lines necessary in flight planning procedure.

References Cited in the file of this patent

UNITED STATES PATENTS

| | | |
|---|---|---|
| 1,708,551 | Nell | Apr. 9, 1929 |
| 1,993,347 | McMillian | Mar. 5, 1935 |
| 2,039,333 | Musham | May 5, 1936 |
| 2,178,962 | Gottschalk | Nov. 7, 1939 |